United States Patent Office 3,270,312
Patented August 30, 1966

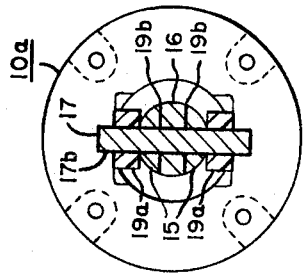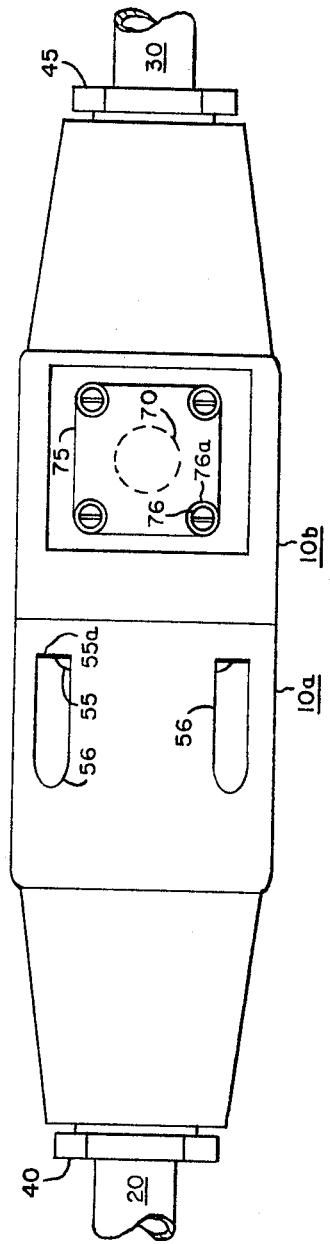

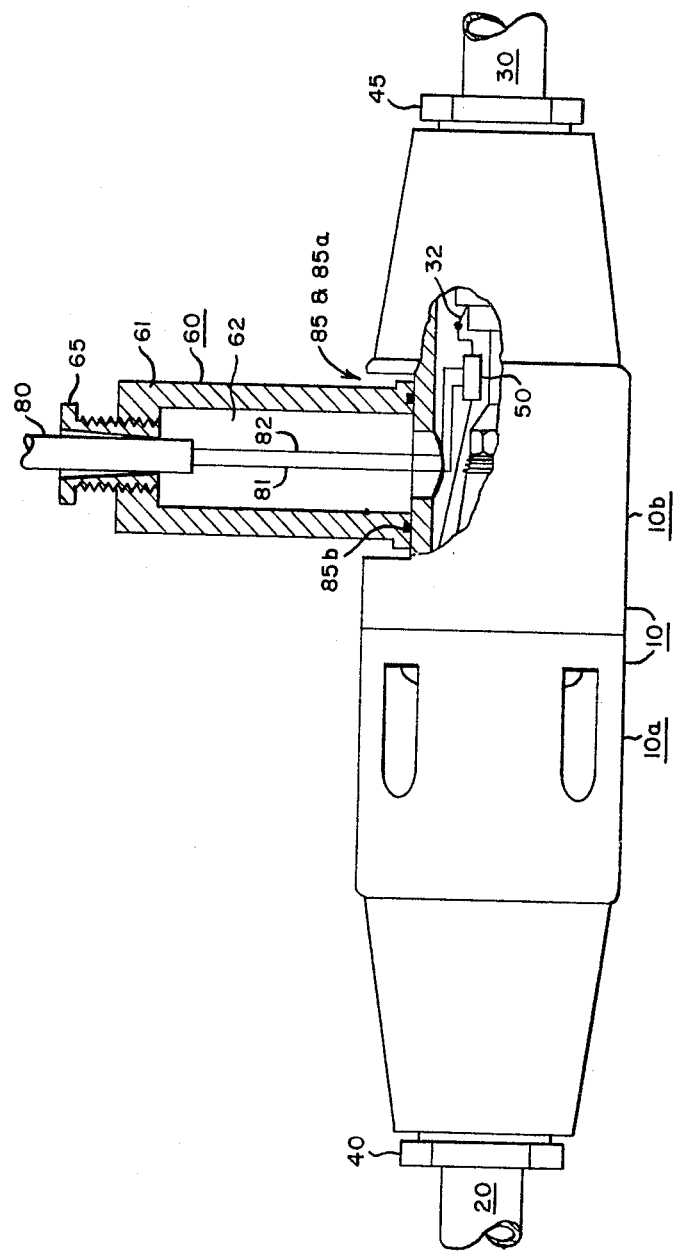

3,270,312
CABLE SPLICE
Robert I. Olsen, Newport, R.I., assignor to Hazeltine Research Inc., a corporation of Illinois
Filed Mar. 31, 1964, Ser. No. 356,295
6 Claims. (Cl. 339—94)

The present invention is directed to underwater cable connections and more particularly to water pressure-proof junctions for use with nonarmored coaxial cables having strength members in the center of the cables.

Underwater coaxial cables are used for a variety of purposes and play especially important roles in the sonar and communications fields. It is very often desirable to electrically interconnect the conductors of two cables together or to provide external access to the conductors of a given cable. For such purposes, armored coaxial cables, rather than the nonarmored coaxial cables, have been used since the metal plating around such cables facilitates the interconnection between two such cables. However, armored coaxial cables have apparent disadvantages in that the armored plating surrounding the cables are susceptible to marine growth, the armor itself creates a bulkiness which impedes efficient layout of the cables and the expense of the armored cable when contrasted to the nonarmored coaxial cable is prohibitive.

It is therefore an object of the present invention to provide a water-pressure-proof junction in which the conductors of two nonarmored cables may be electrically interconnected.

It is a further object of the present invention to provide a water-pressure-proof junction between two nonarmored cables having strength members in the center of the cables and in which access can be made to external circuitry.

It is still a further object of the present invention to provide a water-pressure-proof junction between two nonarmored cables having strength members in the center of the cables and in which electrical circuitry may be installed.

In accordance with the present invention a water-pressure-proof junction for use with nonarmored coaxial cable having a strength member in the center of the cable comprises first clevis-socket type coupling means for structurally terminating the central strength member of a cable, second eye-socket type coupling means for structurally terminating the central strength member of a cable and third means including a shell for encompassing the first and second means and providing a water-pressure-proof chamber with provision for permitting access to external electrical circuitry and within which the conductors of two cables may be electrically interconnected and electrical circuitry may be installed. The invention further includes fourth means structurally secured within the third means for structurally joining the first and second means and preventing axial and twisting movement of a cable, and fifth means including tapered bushings for terminating the third means and structurally sealing the fittings between two cables and the third means and thereby maintaining the chamber water-pressure-proof.

For a better understanding of the present invention together with other and further objects thereof, reference is had to the following description taken in connection with the accompanying drawings, and its scope will be pointed out in the appended claims.

Referring to the drawings:

FIG. 2 shows in a half-section view the structural joint between the strength members of two cables;

FIG. 3 shows in a top view the present invention as illustrated in FIG. 1, and

FIG. 4 shows in a partly sectional side view another embodiment of the present invention.

Figure 1:
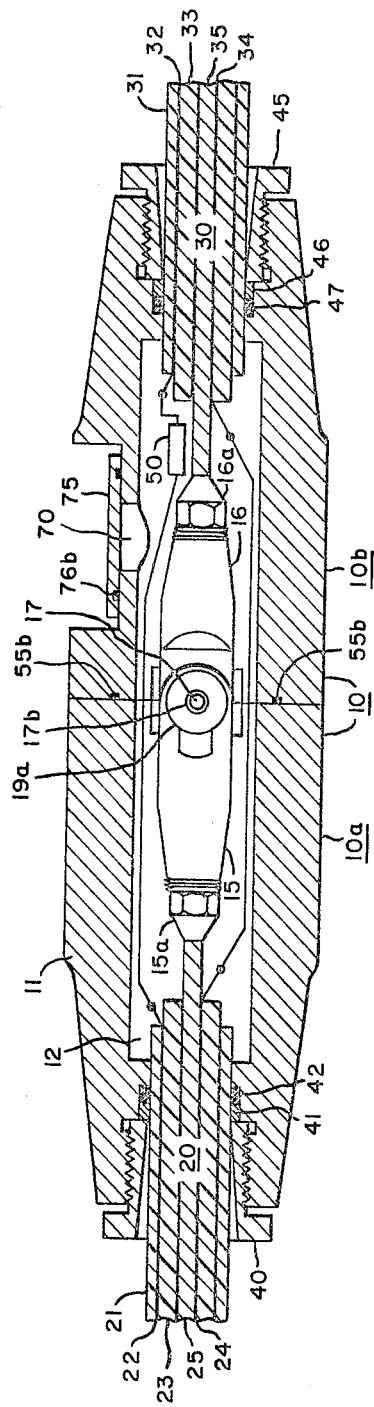
FIG. 1 shows in a half-section view one embodiment of the present invention.

Referring now to FIG. 1 there is represented a half-section view of one embodiment of the present invention, namely a water-pressure-proof junction for use with nonarmored coaxial cable having a strength member in the center of the cable. For the purpose of this specification a water-pressure-proof chamber means a chamber which will remain waterproof under a high degree of water pressure.

The coaxial cable 20 depicted in FIG. 1 consists of an outer layer of polyethylene 21, copper tubing 22 which serves as an outer conductor, an inner layer of polyethylene 23, copper tubing 24 which serves as an inner conductor and central core strength member 25 composed of tensile steel. As shown, the strength member 25 is terminated by bolt 15a and socket 15 threadedly engaged to secure cable 20. Socket 15 is composed of a metallic material, such as steel, which has a clevis or U-type shape and also has inner threading at its tapered end in order to engage bolt 15a which is composed of similar material.

As illustrated, the junction further comprises eye-socket type means 16 for structurally terminating the central strength member 35 of a cable 30. The coaxial cable 30 depicted in FIG. 1 consists of an outer layer of polyethylene 31, copper tubing 32 which serves as an outer conductor, an inner layer of polyethylene 33, copper tubing 34 which serves as an inner conductor and central core strength member 35 composed of tensile steel. As shown, the strength member 35 is terminated by bolt 16a and socket 16 threadedly engaged to secure cable 30. Socket 16 is composed of a metallic material, such as steel, which has a flattened eye needle type shape and also an inner threading at its tapered end in order to engage bolt 16a which is composed of similar material.

As illustrated, the junction further comprises third means 10 for encompassing first means 15 and second means 16 and providing a water-pressure-proof chamber 12 with provision for permitting access to external circuitry 70 and within which the conductors 22 and 24 of cable 20 and conductors 32 and 34 of cable 30 may be electrically interconnected and within which electrical circuitry 50 may be installed. As shown, third means 10 consists of two half-shells 10a and 10b structurally fastened together by a plurality of bolts 55. In FIG. 1, since it is a half-section, only two externally threaded bolts 55 are shown but four bolts equally displaced from one another fasten the shell into one unit. Referring now to FIG. 3 there is represented a top view of a pressure-proof junction constructed in accordance with the present invention which shows two grooves 56 slanting downward into the outer housing of one of the halves of the shell 10a. The two bolts 55 and associated washers 55a shown in the grooves, pass through the outer housing of half-shell 10a and threadedly engage the outer housing of the other half-shell 10b. In this manner the shell 10 is fastened together after the cables have been assembled and the water-tight connection is insured by O-ring 55b shown in FIG. 1.

Shell 10, the combination of half-shells 10a and 10b, may be considered to be comprised of an outer housing 11 which is composed of metallic material, such as steel, with an inner chamber 12 which is filled with epoxy to secure the electrical interconnections within the junction and enhance the dryness of the chamber. As shown, cables 20 and 30 are pared down in segments upon entry into the chamber 12 and thus it is possible to interconnect the conductors 22 and 24 of cable 20 with conductors 32 and 34 of cable 30 in any manner whatsoever. Additional circuitry 50 is also shown installed within chamber 12 and may be connected to the conductors 22 and 24 of cable 20 and conductors 32 and 34 of cable 30 in serial or parallel fashion. Shell 10 further comprises a port 70 located in half-shell 10b protruding from inner chamber 12 through outer housing 11. Water is kept from entering into inner chamber 12 by the removable cap 75 which is secured to the outer housing of shell 10 by externally threaded bolts 76 and associated washers 76a and O-rings 76b. In FIG. 1 since it is a half-section only two bolts 76 are shown but it should be understood that four equally displaced bolts in all fasten the cap 75 to the outer housing 11 as shown in FIG. 3.

As illustrated, the junction further comprises fourth means 17 for structurally joining said first means 15 and said second means 16. Referring now to FIG. 2 there is represented a half-section of the structural joint affected by fourth means 17. Bolt 17 which is composed of metallic material, such as steel, passes through, in order, the circular opening of one prong of clevis-socket 15, the opening of eye-socket 16, and the circular opening of the other prong of clevis-socket 15 thus joining the two sockets together and preventing twisting movement of the joint. Bolt 17 is also surrounded by an insulating material, 17b, such as plastic, which insulates the bolt 17 from clevis 15 and eye-socket 16. Spacers 19a and washers 19b constructed of nonconducting material are further provided to insulate sockets 15 and 16 from each other and thus effect a break in the electrical continuity of the strength members 25 and 35 of cables 20 and 30, respectively. As further shown, the shape of the inner chamber 12 at this junction is such that insulated bolt 17 is secured into one position only and such positioning prevents any axial movement of the junction.

As illustrated, the junction further comprises fifth means 40 and 45 for structurally sealing the fittings between two cables 20 and 30 and said third means 10 thereby maintaining said chamber 12 water-pressure-proof. As shown, fifth means includes bushings 40 and 45 threadedly engaged to the tapered ends of half-shells 10a and 10b, respectively, and encompassing cables 20 and 30, respectively. Bushings 40 and 45 are composed of metallic material, such as steel, and are externally threaded. The interiors of bushings 40 and 45 are tapered inwardly so that a water-tight connection is perfected where the interiors of bushings 40 and 45 meet cables 20 and 30, respectively. As a further protection against water seepage into chamber 12, washers or O-rings 41 and 42 surround cable 20 immediately following the water-tight connection between bushing 40 and cable 20 and similarly, washers or O-rings 46 and 47 surround cable 30 immediately following the water-tight connection between bushing 45 and cable 30.

Referring now to FIG. 4 there is represented a partly half-section, partly side view of another embodiment of the present invention, namely, a water-pressure-proof T junction for use with nonarmored coaxial cable having a strength member in the center of the cable. As illustrated, the T junction first comprises a water-pressure-proof junction between nonarmored coaxial cables having strength members in the center of the cables. This is the same type junction as the one that has been described in detail, supra, and shown in FIG. 1, except that cap 75 is removed.

The T junction further comprises sixth means 60 for encompassing a cable 80 in a water-pressure-proof chamber 62. As shown, sixth means consists of a shell 60 having an outer housing 61 which is composed of a metallic material, such as steel, and an inner chamber 62 for encompassing a cable 80 in a water-pressure-proof chamber 62. The conductors 81 and 82 of cable 80 can be used to tap off signals from cables 20 and 30 in shell 10 and transmit those signals to an out-of-water receiving station and also may be used to insert additional circuitry between cables 20 and 30 in shell 10. As shown, cable 80 is pared down to its conductors 81 and 82 upon entry into the chamber 62 which makes it possible for interconnections to be made in any manner whatsoever between the conductors of cables 20, 30 and 80.

The T junction further comprises seventh means for structurally sealing the fitting between a cable 80 and said sixth means 60. As illustrated, seventh means consists of bushing 65 threadedly engaged to shell 60 and encompassing cable 80. Bushing 65 is composed of metallic material, such as steel, and is externally threaded. The interior of bushing 65 is tapered inwardly so that a water-tight connection is perfected where the interior of bushing 65 meets cable 80.

The T junction further comprises eighth means for structurally joining said sixth means 60 and said third means 10 in a water-tight seal such that an electrical interconnection may be made between the conductors 22 and 24 of cable 20 and the conductors 32 and 34 of cable 30 and the conductors 81 and 82 of cable 80 within said third means 10 or within said sixth means 60. As shown, eighth means consists of externally threaded bolts 85, associated washers 85a and O-ring 85b which are threadedly engaged to the outer housing 12 of half-shell 10b. The connectors 81 and 82 of cable 80 are then passed through port 70 in shell 10b into inner chamber 12 of shell 10b and the appropriate electrical interconnections can be made.

While there have been described what are at present considered to be the preferred embodiment of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A water-pressure-proof junction for use with non-armored coaxial cable having a strength member in the center of the cable comprising:
   first clevis-socket type coupling means for structurally terminating the central strength member of a cable;
   second eye-socket type coupling means for structurally terminating the central strength member of a cable;
   third means including a shell for encompassing said first and second means and providing a water-pressure-proof chamber with provision for permitting access to external electrical circuitry and within which the conductors of two cables may be electrically interconnected and electrical circuitry may be installed;
   fourth means structurally secured within said third means for structurally joining said first and second means and preventing axial and twisting movement of a cable;
   and fifth means including tapered bushings for terminating said third means and structurally sealing the fittings between two cables and said third means and thereby maintaining said chamber water-pressure-proof.

2. A water-pressure-proof junction for use with non-armored coaxial cable having a strength member in the center of the cable comprising:
   first bolt and clevis-socket type coupling means threadedly engaged for structurally terminating the central strength member of a cable;

second bolt and eye-socket type coupling means threadedly engaged for structurally terminating the central strength member of a cable;

third means including a divisible shell structurally fastened into one unit, said shell comprising an outer housing with an inner chamber for encompassing said first and second means and providing a water-pressure-proof chamber within which the conductors of two cables may be electrically interconnected and within which electrical circuitry may be installed, said shell further comprising a port through the outer housing of the shell on one of its sides for providing access to external circuitry;

fourth means including a bolt structurally secured within said third means for structurally joining said first and second means and preventing axial and twisting movement of a cable;

and fifth means including tapered bushings for terminating said third means and structurally sealing the fittings between two cables and said third means and thereby maintaining said chamber water-pressure-proof.

3. A water-pressure-proof junction for use with non-armored coaxial cable having a strength member in the center of the cable comprising:

first bolt and clevis-socket type coupling means threadedly engaged for structurally terminating the central strength member of a cable;

second bolt and eye-socket type coupling means threadedly engaged for structurally terminating the central strength member of a cable;

third means including a divisible shell structurally fastened into one unit by a plurality of bolts, said shell comprising an outer housing and an inner chamber for encompassing said first and second means and providing a water-pressure-proof chamber within which the conductors of two cables may be electrically interconnected and within which electrical circuitry may be installed, said shell further comprising a port through the outer housing of the shell on one of its sides for providing access to external circuitry, said shell further comprising a removable cap placed in said port for maintaining said inner chamber water-pressure-proof;

fourth means including a bolt and insulating washers and spacers structurally secured within said third means for structurally joining and insulating said first and second means and preventing axial and twisting movement of a cable;

and fifth means including tapered bushings for terminating said third means and structurally sealing the fittings between two cables and said third means and thereby maintaining said chamber water-pressure-proof.

4. A water-pressure-proof T junction for use with non-armored coaxial cable having a strength member in the center of the cable, comprising:

first means for structurally terminating the central strength member of a first cable;

second means for structurally terminating the central strength member of a second cable;

third means for encompassing said first and second means and providing a water-pressure-proof chamber with a port providing access to external circuitry and within which the conductors of two cables may be electrically interconnected and electrical circuitry may be installed;

fourth means for structurally joining said first and second means;

fifth means for structurally sealing the fittings between two cables and said third means and thereby maintaining said chamber water-pressure-proof;

sixth means for encompassing a cable in a water-pressure-proof chamber;

seventh means for structurally sealing the fittings between a cable and said sixth means;

and eighth means for structurally joining said sixth means and said third means via said port in a water-tight seal such that an electrical interconnection may be made between the conductors of the two cables within said third means and the conductors of the cable within said sixth means.

5. A water-pressure-proof T junction for use with non-armored coaxial cable having a strength member in the center of the cable, comprising:

first clevis-socket type coupling means for structurally terminating the central strength member of a cable;

second eye-socket type coupling means for structurally terminating the central strength member of a cable;

third means including a shell for encompassing said first and second means and providing a water-pressure-proof chamber with a port providing access to external electrical circuitry and within which the conductors of two cables may be electrically interconnected and electrical circuitry may be installed;

fourth means structurally secured within said third means for structurally joining said first and second means and preventing axial and twisting movement of a cable;

fifth means including tapered bushings for terminating said third means and structurally sealing the fittings between two cables and said third means and thereby maintaining said chamber water-pressure-proof;

sixth means including a shell for encompassing a cable carrying electrical signals from an out-of-water source in a water-pressure-proof chamber;

seventh means including a tapered bushing for terminating one end of said sixth means and structurally sealing the fitting between a cable and said sixth means;

and eighth means including a plurality of bolts for structurally joining said sixth means and said third means via said port in a water-tight seal such that an electrical interconnection may be made between the conductors of the two cables within said third means and the conductors of the cable within said sixth means.

6. A water-pressure-proof T junction for use with non-armored coaxial cable having a strength member in the center of the cable, comprising:

first bolt and clevis-socket type coupling means threadedly engaged for structurally terminating the central strength member of a cable;

second bolt and eye-socket type coupling means threadedly engaged for structurally terminating the control strength member of a cable;

third means including a divisible shell structurally fastened into one unit, said shell comprising an outer housing with an inner chamber for encompassing said first and second means and providing a water-pressure-proof chamber within which the conductors of two cables may be electrically interconnected and within which electrical circuitry may be installed, said shell further comprising a port through the outer housing of the shell on one of its sides for providing access to external circuitry;

fourth means including a bolt structurally secured within said third means for structurally joining said first and second means and preventing axial and twisting movement of a cable;

fifth means including tapered bushings for terminating said third means and structurally sealing the fittings between two cables and said third means and thereby maintaining said chamber water-pressure-proof;

sixth means including a shell comprising an outer housing and an inner chamber for encompassing a cable carrying electrical signals from an out-of-water source in a water-pressure-proof chamber;

seventh means including a tapered bushing for terminating one end of said sixth means and structurally sealing the fitting between a cable and said sixth means; and eighth means including a plurality of bolts for structurally joining the outer housings of said sixth means and said third means via said port in a water-tight seal such that an electrical interconnection may be made between the conductors of the two cables within said third means and the conductors of the cable within said sixth means.

References Cited by the Examiner

UNITED STATES PATENTS

| 2,572,448 | 10/1951 | Child | 339—49 |
| 2,590,131 | 3/1952 | Schonstedt | 174—1 |
| 3,116,361 | 12/1963 | Bentz et al. | 339—103 |

EDWARD C. ALLEN, *Primary Examiner.*

PATRICK A. CLIFFORD, *Examiner.*

J. H. McGLYNN, *Assistant Examiner.*